Aug. 31, 1954   R. L. CALHOUN   2,687,598
TREE POISON INJECTING TOOL
Filed Dec. 7, 1949
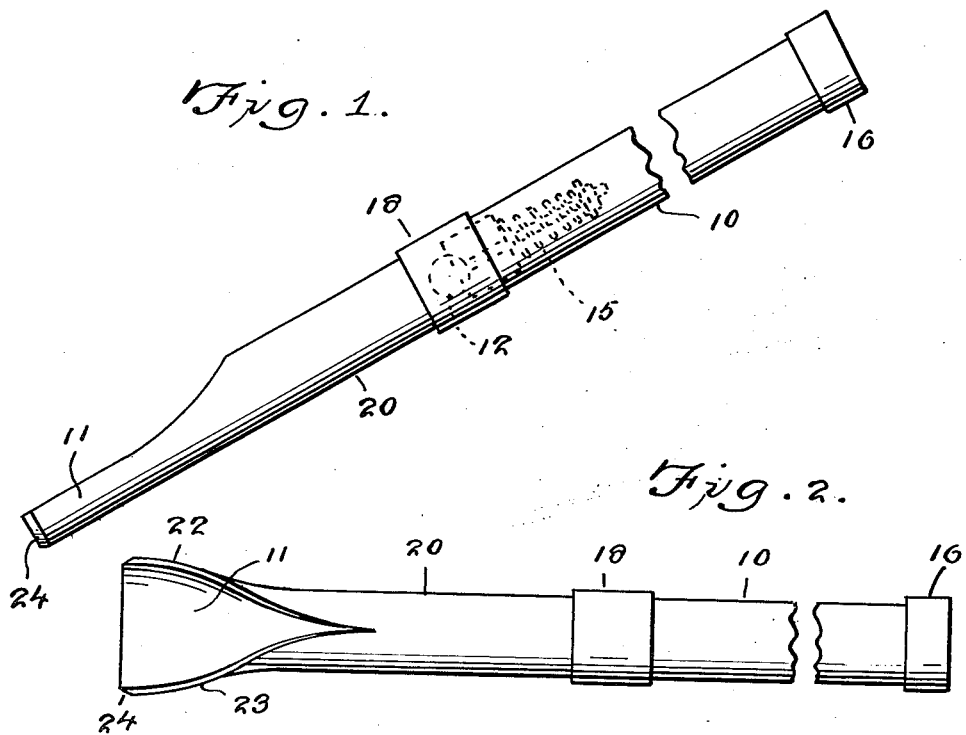
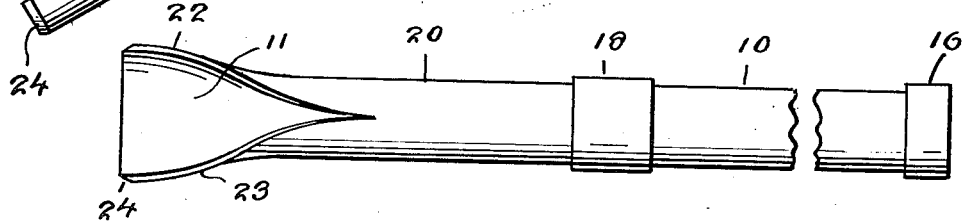
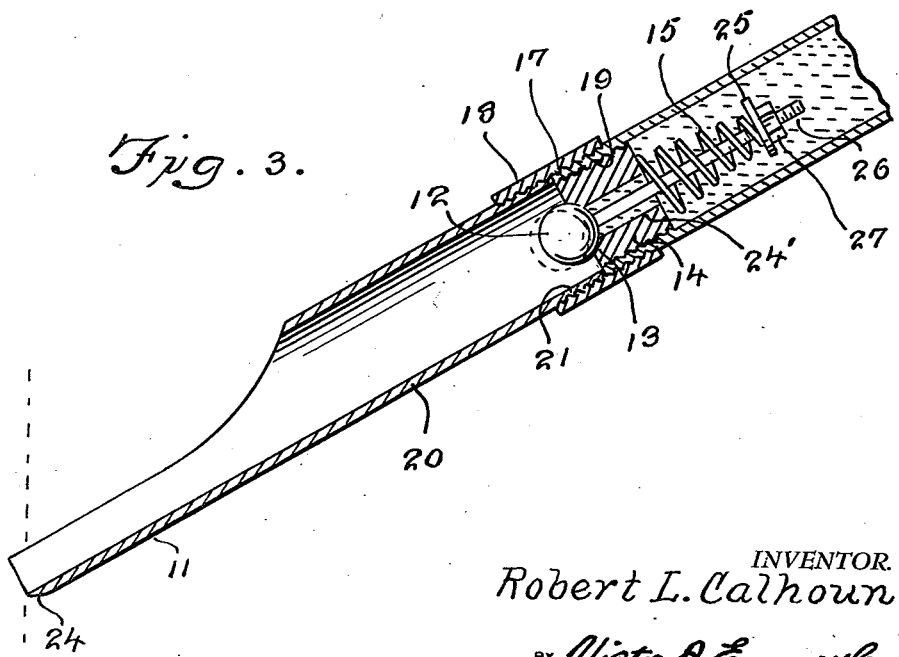
INVENTOR.
Robert L. Calhoun
BY Victor J. Evans & Co.
ATTORNEYS Patented Aug. 31, 1954

2,687,598

UNITED STATES PATENT OFFICE 2,687,598

TREE POISON INJECTING TOOL

Robert L. Calhoun, Hopkinsville, Ky.

Application December 7, 1949, Serial No. 131,591

1 Claim. (Cl. 47—57.5)

This invention relates to toxic or poisonous product applying devices for killing plant life and particularly for killing trees, and in particular a tool having a tubular reservoir with a sharp blade extended at one end and with a spring actuated valve between the reservoir and blade whereby as the blade is jabbed into the side of a tree the shock opens the valve and permits a quantity of poisonous liquid to pass along the blade and into the gash, made by the blade through the bark of the tree wherein the poisonous liquid passes into the sap of the tree.

The purpose of this invention is to provide means for instantly discharging a supply of poisonous liquid along a blade as the blade strikes an object so that only a single jab is required to open a gash in a tree and inject a supply of poisonous liquid into the sap of the tree.

Various weed killing devices have been provided through which poisons are injected into the ground and other means have been employed for spraying trees with poisonous liquid but it is difficult with these methods to confine the poison to the tree for which it is intended so that surrounding vegetation is damaged. With this thought in mind this invention contemplates a poison applying device that is jabbed into the side of a tree and at the same instant shock from the jabbing action releases a quantity of poison that is discharged directly into the sap of the tree.

The object of this invention is, therefore, to provide means for applying a poison directly to the sap of a tree without permitting escape of the poison to surrounding vegetation.

Another object of the invention is to provide a tree poisoning tool that operates instantaneously with a single jab so that a row of trees, or all trees in a certain area may be treated with the poison in a comparatively short time.

A further object of the invention is to provide a tree poisoning tool that forms a hole and injects a poison into the hole with a single action which is of a simple and economical construction.

With these and other objects and advantages in view the invention embodies a tubular handle having a poison retaining reservoir therein with an arcuate blade extended from one end of the tube and with a valve positioned between the tube and blade that opens against a spring as the end of the blade strikes an object.

Other features and advantages of the invention will appear from the following description taken in connection with the drawings wherein:

Figure 1 is a side elevational view showing the tool with parts broken away.

Figure 2 is a plan view illustrating the shape of the bit or blade at the end of the tool and also with part of the handle broken away.

Figure 3 is a longitudinal section through the tool with the upper part of the handle broken away and showing the valve therein in the closed position in full lines and in the open position in dotted lines.

Referring now to the drawings wherein like reference characters denote corresponding parts the tree poisoning tool of this invention includes a tubular handle 10 forming a poison retaining reservoir, a blade 11 extended from one end of the tube and a valve formed with a ball 12 that is held against the seat 13 in a plug 14 by a spring 15.

The tubular casing 10 which forms the handle is provided with a threaded outer end on which a closure cap 16 is positioned, and the inner end is formed as shown in Figure 3 with threads 17 in the outer surface for receiving the coupling 18 and threads 19 in the inner surface into which the plug 14 is threaded.

The blade 11 is formed at the end of a tubular shank 20, the upper end of which is provided with threads 21 that screw into the coupling 18, and as illustrated in Figures 2 and 3 the upper part of the lower end of the shank is cut away and the wall of the lower part is flattened out providing the arcuate blade section 11 with upwardly extended walls 22 and 23 at the sides. The outer edge of the blade section is beveled as shown at the point 24 thereby providing an arcuate spoon shaped blade with a trough formed in the inner surface whereby with the end of the blade jabbed through the bark of a tree a poison liquid from the storage container in the handle flows down the inner surface of the trough and through the trough into the tree where it attacks the sap thereof. The valve seat is formed at the end of an opening 24' through the plug 14 and the spring 15 holds the ball against the seat with the spring acting against the upper end of the plug 14 and against a washer 25 that is held on a stem 26, extended from the ball 12, by a nut 27.

With the parts arranged in this manner the closure cap 16 may be removed to fill the tubular handle with a poisonous liquid or the like and with the cap replaced the tool may be gripped in both hands and the blade 11 jabbed into a tree with the sharp end thereof penetrating the bark and passing into the wood, and in this movement the shock resulting from striking the tree as well as the liquid in the upper part of the handle striking the washer 25 forces the ball 12 away from the seat 13 for an instant and in this short period of time about a tablespoon-full of poison from the handle passes through the valve, running down the trough in the tubular shank 20 and passes into the tree where it comes in contact with the sap thereof.

By this means the poison is not sprayed into the air but is applied directly to the inner area of the tree.

It will be understood that modifications may be made in the design and arrangement of the parts without departing from the spirit of the invention.

What is claimed is:

In a poison injecting tool, the combination which comprises a tubular casing having a closure cap removably mounted on the outer end and having threads on the inner surface of the inner end, an internally threaded coupling extended from the inner end, an arcuate blade carried by the coupling and extended from the inner end of the casing, a plug with an opening therethrough threaded in the inner end of the casing, a ball having a stem extended therefrom positioned in the opening of the plug with the stem extended through the opening, a washer secured on the inner end of the stem of the ball, a spring on the stem between the plug and washer to force the ball into closing engagement with the opening in the plug and said ball being forced out of engagement with said opening upon impact of the blade with a tree for the injection of poison into the tree.

References Cited in the file of this patent

UNITED STATES PATENTS

| Number | Name | Date |
|---|---|---|
| 1,372,228 | Humphreys | Mar. 22, 1921 |
| 1,661,595 | Bowen | Mar. 6, 1928 |
| 2,116,591 | Barber | May 10, 1938 |
| 2,309,391 | Hecht | Jan. 26, 1943 |
| 2,323,773 | Irish | July 6, 1943 |

FOREIGN PATENTS

| Number | Country | Date |
|---|---|---|
| 2,677 | Australia | of 1921 |
| 22,970 | Australia | of 1925 |
| 548,059 | France | Oct. 10, 1922 |
| 708,127 | France | Apr. 27, 1931 |